(12) United States Patent
Imai

(10) Patent No.: US 7,198,480 B2
(45) Date of Patent: Apr. 3, 2007

(54) INJECTION MOLDING SYSTEM WITH HIGH PRODUCTION EFFICIENCY AND LOW SYSTEM COST

(75) Inventor: Shoichi Imai, Whittier, CA (US)

(73) Assignee: Yamato Engineering, Inc., Whittier, CA (US)

( * ) Notice: Subject to any disclaimer, the term of this patent is extended or adjusted under 35 U.S.C. 154(b) by 7 days.

(21) Appl. No.: 11/049,267

(22) Filed: Feb. 1, 2005

(65) Prior Publication Data

US 2006/0172039 A1    Aug. 3, 2006

(51) Int. Cl.
*B29C 45/04*    (2006.01)

(52) U.S. Cl. .................. 425/556; 425/575; 425/595

(58) Field of Classification Search ............. 425/556, 425/575, 576, 595
See application file for complete search history.

(56) References Cited

U.S. PATENT DOCUMENTS

| | | | | |
|---|---|---|---|---|
| 4,424,015 A | * | 1/1984 | Black et al. | 425/576 |
| 4,810,181 A | * | 3/1989 | Ozawa | 425/575 |
| 4,861,258 A | * | 8/1989 | Margiaria et al. | 425/575 |
| 5,286,186 A | * | 2/1994 | Brown et al. | 425/576 |
| 5,456,588 A | * | 10/1995 | Yonekubo et al. | 425/575 |
| 5,603,967 A | * | 2/1997 | Ferguson | 425/575 |
| 5,855,935 A | * | 1/1999 | Brent et al. | 425/576 |
| 6,638,047 B2 | * | 10/2003 | Asai et al. | 425/576 |

FOREIGN PATENT DOCUMENTS

JP    5-185463    *    7/1993

* cited by examiner

*Primary Examiner*—James P. Mackey
(74) *Attorney, Agent, or Firm*—Muramatsu & Associates

(57) ABSTRACT

An injection molding system has a plurality of movable sub-clamping units each having a mold therein and a main clamping unit for clamping the mold in the sub-clamping unit. Each of the sub-clamping units alternately enters the main clamping unit for only a filling process to receive the melted resin material from an injection unit. Each sub-clamping unit clamps the mold by its own clamping mechanism and moves to the main clamping unit where the mold is further clamped by a higher clamping pressure by the main clamping unit during the filling process. Each sub-clamping unit is retracted from the main clamping unit immediately after the filling process and stayed outside of the main clamping unit through the holding process and the cooling process, thereby dramatically improving the molding production efficiency.

11 Claims, 14 Drawing Sheets

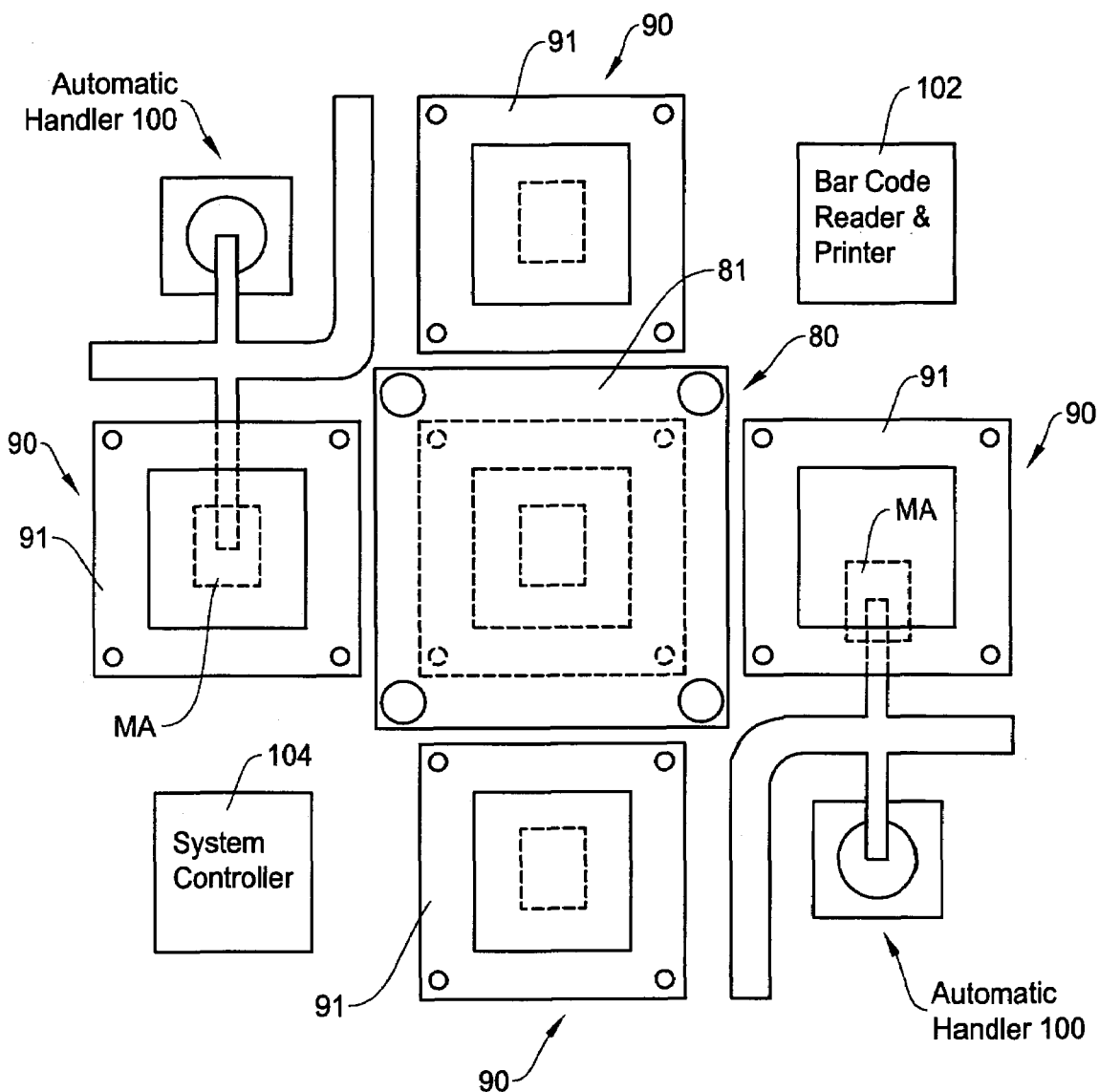

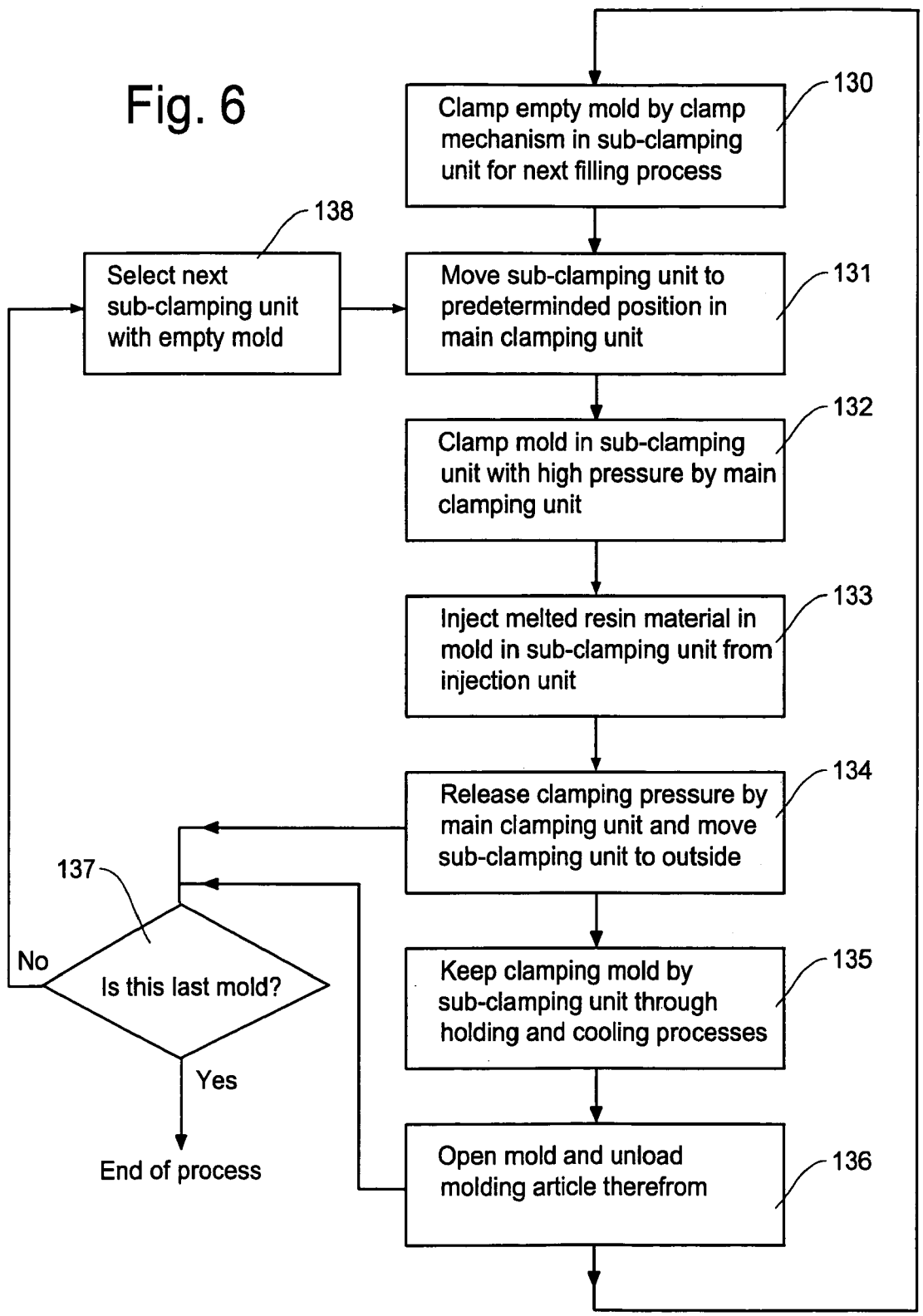

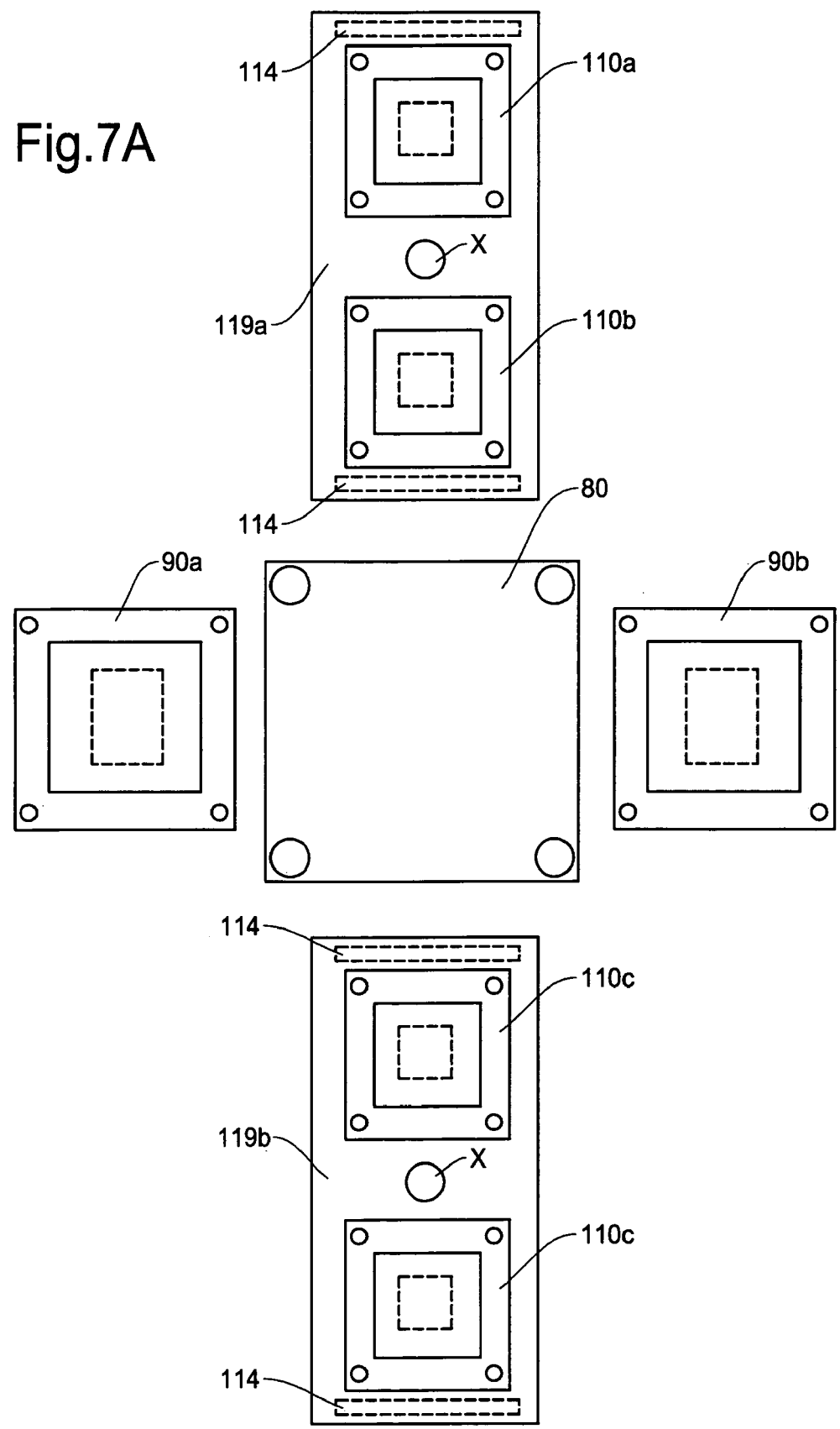

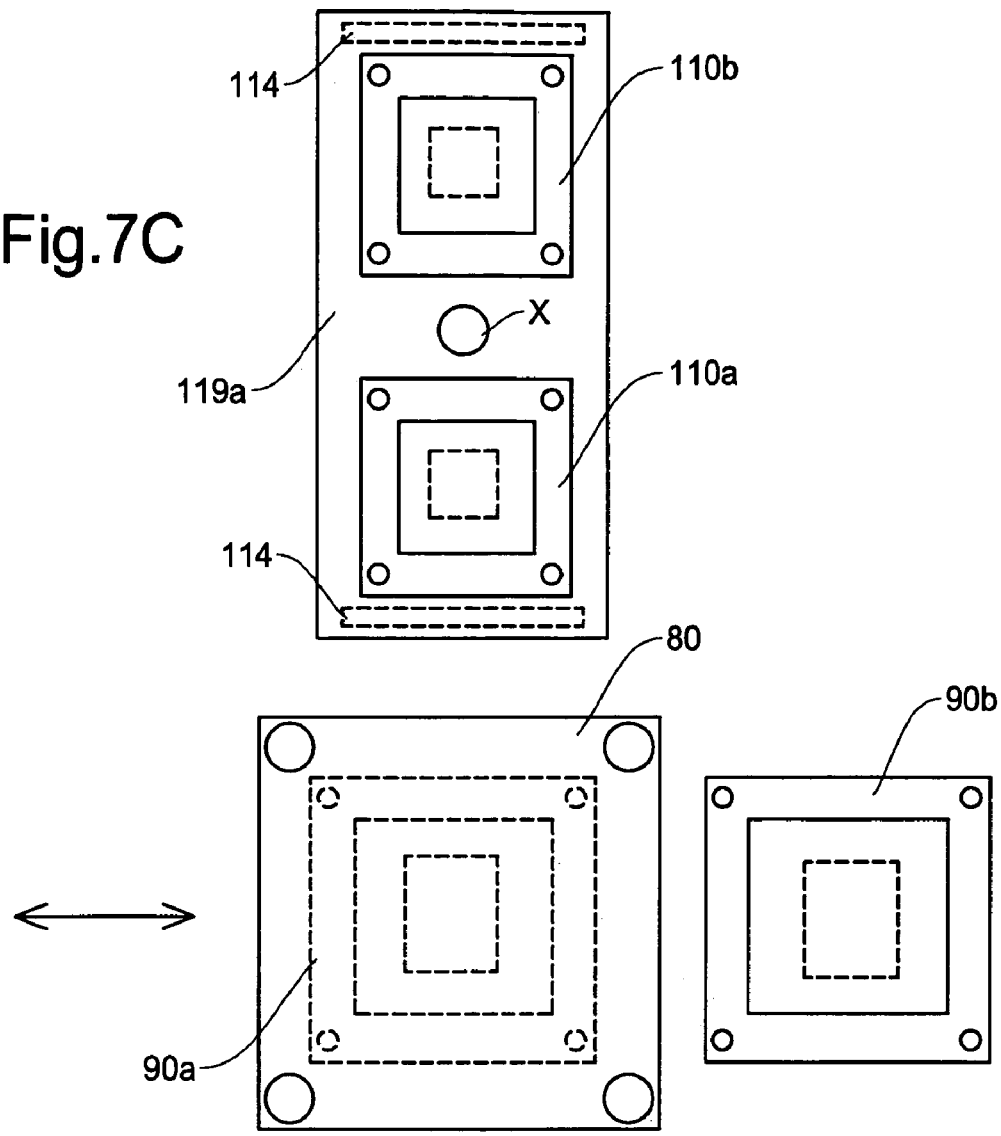
Fig.7C
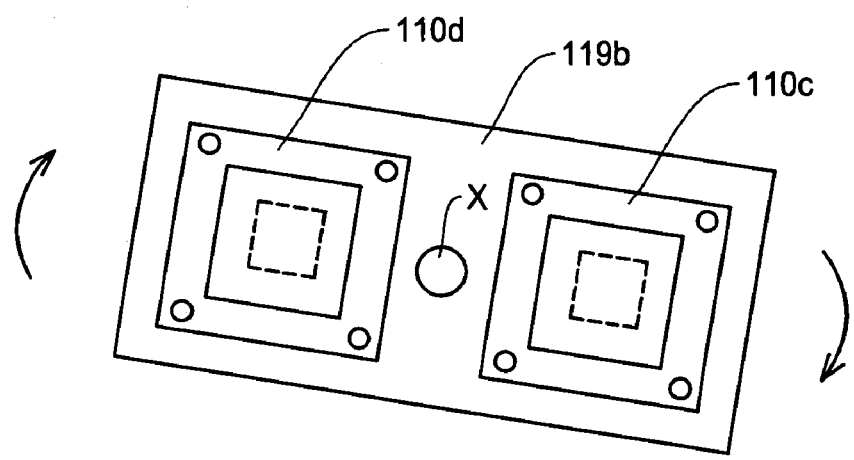

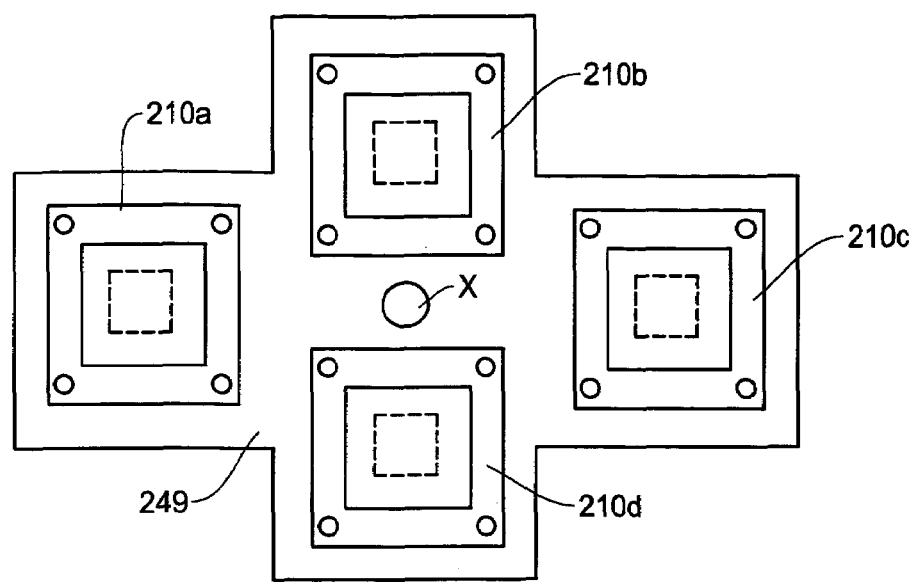
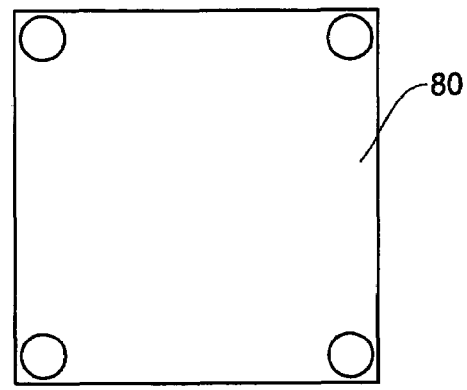
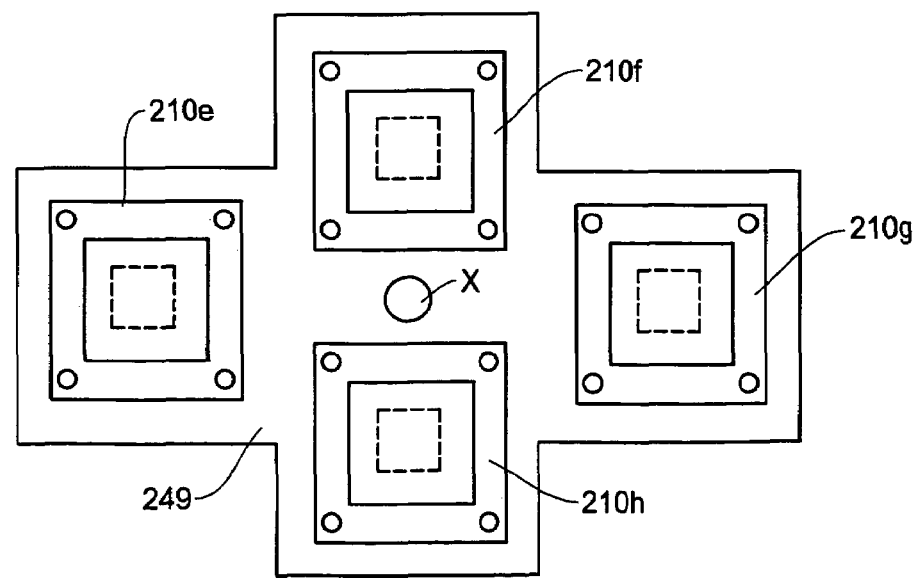
Fig.8

INJECTION MOLDING SYSTEM WITH HIGH PRODUCTION EFFICIENCY AND LOW SYSTEM COST

FIELD OF THE INVENTION

This invention relates to an injection molding system for molding resin materials and, more particularly, to an injection molding system having a plurality of movable sub-clamping (mold) units alternately advancing to a location of a main clamping unit for only an filling process, thereby enabling to dramatically improve an overall production efficiency while reducing an overall system cost.

BACKGROUND OF THE INVENTION

Generally, injection molding of a resin product is carried out through a molding cycle comprising a resin melting process, a filling process, a holding process, and a cooling process. In order to obtain a molded product having an excellent quality, it is a common practice to control a temperature of a mold comprising a fixed mold and a movable mold, a temperature of a resin material within the mold, an injection pressure, and the like. In addition to such control, it is also important to control a clamping pressure applied to the mold. Furthermore, it is important to determine a timing of switching from the filling process to the holding process.

FIG. 1 schematically shows an example of injection molding machine of a horizontal type where the mold is clamped in a horizontal direction. The injection molding machine is basically comprised of an injection unit 10 and a clamping unit 20. In the injection unit 10, a resin material is put into a hopper 11 and are supplied to a heating cylinder 12. The resin material is melted in the heating cylinder 12 while being kneaded and measured by a screw 13. The melted resin material is reserved in a forward area before the screw 13. The screw 13 is rotated by a rotation driving mechanism (not shown). The screw 13 is also driven by a first hydraulic cylinder mechanism comprising an injection cylinder 14 and a piston 15 and is moved forward, namely, towards a mold. When the first hydraulic mechanism makes the screw 13 move towards the mold, the melted resin material reserved in the forward area before the screw 13 is delivered through a nozzle 16 to be filled within a cavity of the mold comprising a fixed mold 17 and a movable mold 18. In a filling process and a holding process, driving oil having a controlled flow speed and pressure flows into and flows out from an injection cylinder 14 through an inlet/outlet port 14-1.

The clamping unit 20 includes a fixed platen 21 to which the fixed mold 17 is attached and a rear platen 22. Both platens 21 and 22 are fixedly supported through four tie bars 23 (only two of them are illustrated). Behind the rear platen 22, a second hydraulic cylinder mechanism including a hydraulic cylinder 24 and a piston 25 is formed. The piston 25 is coupled to a movable platen 26 to which the movable mold 18 is attached. The movable platen 26 is slidable along the tie bars 23 with the movement of the piston 25. Thus, when the driving oil is fed from an inlet/outlet port 24-1 to the hydraulic cylinder 24, the movable platen 26 is moved in a direction such that the mold is closed. At this time, the driving oil flows out from an inlet/outlet port 24-2. On the other hand, when the driving oil is fed from the inlet/outlet port 24-2 to the hydraulic cylinder 24, the movable platen 26 is moved in another direction such that the mold is opened. At this time, the driving oil flows out from the inlet/outlet port 24-1.

The hydraulic cylinder 24 is provided with a pressure sensor 27 for detecting a hydraulic pressure. While the mold is closed, the pressure sensor 27 detects a hydraulic pressure within the hydraulic cylinder 24. The clamping pressure is controlled in response to the pressure detection signal from the pressure sensor 27. The fixed platen 21 and the movable platen 26 are provided with a distance sensor 28 for detecting a platen distance. After the predetermined time length of the holding process and the cooling process, the movable mold 18 is retracted and a molding article (resin material) is retrieved from the mold.

FIGS. 2A and 2B schematically show another example of injection molding machine of a vertical type where the mold is clamped in a vertical direction. FIG. 2A is a front view and FIG. 2B is a plan view, respectively, of the injection molding machine. In an injection unit 30, a resin material is put into a hopper 31 and is supplied to a heating cylinder 32. The resin material is melted in the heating cylinder 32 and is kneaded by a screw 33. The screw 33 is driven by a hydraulic cylinder mechanism 34 and is moved towards the mold. The melted resin material reserved in the forward area of the screw 13 is delivered through a nozzle to be filled within a cavity of the mold comprising a lower mold 37 and an upper mold 38.

A clamping unit 40 has a fixed platen 41 on which a transfer table having the lower mold 37 is placed and an upper platen 42 which is fixedly supported through four support bars 43 (only two of them are illustrated). On the upper platen 42, a second hydraulic cylinder mechanism 44 is formed. The piston 45 is arranged in the hydraulic cylinder mechanism 44 and is coupled to a movable platen 46 to which the upper mold 38 is attached. The movable platen 46 is slidable along the support bars 43 with the movement of the piston 45. Thus, through the hydraulic pressure, the movable platen 46 is moved in a direction such that the mold is closed or opened. When the mold is closed, the melted resin material from the injection unit 30 is filled in the cavity of the mold to form the molding article.

After the predetermined time length of the holding process and the cooling process, the upper mold 38 is retracted. The lower mold 37 is withdrawn from the clamping unit by, for example, rotating the table 49, for removing the molding article (molded product) from the mold. In this example, the table 49 has two lower molds 37 so that while one lower mold 37 is in the cooling process and article removing process at the outside of the clamping unit 40, the other lower mold 37 can be clamped for the filling process and holding process in the clamping unit 40.

To improve the production efficiency, a plurality of molds can be rotatably provided to the clamping unit in a rotary type injection molding machine. FIG. 3 is a schematic plan view showing an example of rotary type injection molding machine. Similar to the above examples, an injection unit 50 includes a hopper 51, a heating cylinder 52, a screw 53, and a hydraulic cylinder mechanism 54. A clamping unit 60 has a structure substantially the same as that shown in FIG. 2A. In this example, a table 69 has four lower molds 57 thereon. By rotating the table 69, the lower molds 57 are sequentially supplied to the clamping unit 60 for the filling and holding processes. Since the cooling process which requires a relatively long time can be done outside of the clamping unit 60, it is possible to improve the production efficiency.

The foregoing conventional technologies are insufficient for further improving the production efficiency. For example, in the rotary type injection molding machine of FIG. 3, since the order of the lower molds 57 to be supplied to the clamping unit 60 is fixed because of the rotation direction of the table 69, once a problem arises, for example, in one of the lower molds 57, a total system has to be stopped. Further, during the holding process and at least a part of the cooling process, the lower mold 57 has to be stayed in the clamping unit 60 so that the mold is closed during that periods. Therefore, an injection molding system designed by a totally new concept is desired for dramatically improving the production efficiency.

SUMMARY OF THE INVENTION

It is, therefore, an object of the present invention to provide an injection molding system which is capable of dramatically increasing the molding efficiency while reducing the total system cost.

It is another object of the present invention to provide an injection molding system configured by a main clamping unit and a plurality of sub-clamping units each having a fixed mold and a movable mold.

It is a further object of the present invention to provide an injection molding system configured by a main clamping unit and a plurality of sub-clamping units where the mold in each sub-clamping unit is clamped by the main clamping unit only during a filling process.

It is a further object of the present invention to provide an injection molding system configured by a main clamping unit and a plurality of sub-clamping units where each sub-clamping unit is retracted from the main clamping unit immediately after the filling process and stayed outside of the main clamping unit through a holding process and a cooling process.

It is a further object of the present invention to provide an injection molding system configured by a main clamping unit and a plurality of sub-clamping units where each sub-clamping unit is able to open and close the mold by itself thereby retrieving a molding article therefrom after the cooling process.

In the present invention, an injection molding system for carrying out an injection molding cycle is comprised of: a plurality of sub-clamping units each having a mold configured by a fixed mold and a movable mold and a clamping mechanism for clamping the mold with a predetermined pressure; an injection unit which produces melted resin material and injects the melted resin material into a cavity in the mold in the sub-clamping unit; and a main clamping unit which clamps the mold in the sub-clamping unit as soon as the sub-clamping unit is positioned therein by a clamping pressure sufficient for the mold to receive the melted resin material from the injection unit. Each of the sub-clamping units moves back and forth between its station and the main clamping unit, and wherein the sub-clamping unit comes out from the main clamping unit as soon as the cavity of the mold is filled with the melted resin material.

In the injection molding system of the present invention, the clamping mechanism in the sub-clamping unit continuously clamps the mold by pressing the movable mold before, during and after receiving the melted resin material from the injection unit. The predetermined pressure applied to the mold by the clamping mechanism in the sub-clamping unit is much lower than the clamping pressure applied to the mold by the main clamping unit. The clamping pressure applied to the mold by the main clamping unit is released as soon as the melted resin material is filled in the cavity of the mold so that the sub-clamping unit can come out from the main clamping unit immediately thereafter.

In the injection molding system of the present invention, the clamping mechanism in the sub-clamping unit continuously clamps the mold by pressing the movable mold after receiving the melted resin material in the cavity during a holding process and a cooling process of the molding cycle at the outside of the main clamping unit. The clamping mechanism in the sub-clamping unit opens the mold by withdrawing the movable mold from the fixed mold after a cooling process of the molding cycle for retrieving a molding article from the mold.

In the injection molding system of the present invention, as soon as the sub-clamping unit comes out from the main clamping unit, other sub-clamping unit clamping the mold therein moves to the main clamping unit to be clamped by the main clamping unit with the clamping pressure sufficient for the mold to receive the melted resin material from the injection unit, and wherein the other sub-clamping unit comes out from the main clamping unit as soon as the cavity of the mold is filled with the melted resin material.

In the injection molding system of the present invention, each of the sub-clamping units includes a transfer mechanism so that the sub-clamping unit moves back and forth between its station and the main clamping unit independently from one another. The injection molding system further includes a table which mounts two or more sub-clamping units thereon, wherein the table includes a transfer mechanism to transfer the sub-clamping unit back and forth between its station and the main clamping unit. The table further includes a rotary mechanism to change a direction of the table so that each and every sub-clamping unit on the table can be transferred to the main clamping unit.

According to the present invention, the injection molding system is configured by a main clamping unit and a plurality of sub-clamping units each having a fixed mold and a movable mold. Each sub-clamping unit clamps the fixed mold and the movable mold by its own clamping mechanism and moves to the main clamping unit where the mold is further clamped by a higher clamping pressure during a time when filling the molten in the mold. Each sub-clamping unit is retracted from the main clamping unit immediately after the filling process and stayed outside of the main clamping unit through the holding process and the cooling process. Further, each sub-clamping unit is able to open and close the mold by itself thereby retrieving a molding article therefrom after the cooling process.

Namely, the sub-clamping unit is clamped by the main clamping unit by the high clamping pressure only during the filling process. In other words, the sub-clamping unit enters the main clamping unit only for the filling process and comes out from the main clamping unit for the remaining processes because it has its own clamping mechanism for clamping the mold. When one sub-clamping unit comes out from the main-clamping unit, other sub-clamping unit can enter the main clamping unit immediately thereafter, thereby enabling to dramatically increase the molding efficiency because the main clamping unit is occupied only for a time period for injecting the molten into the mold. The order of the sub-clamping units for entering the main clamping unit can be freely changed because each sub-clamping unit has a transfer mechanism, thus, the injection molding system of the present invention does not have to stop even when problems arise in one or more sub-clamping units.

BRIEF DESCRIPTION OF THE DRAWING

FIG. 2A is a front view thereof and FIG. 2B is a plan view thereof.

FIGS. 4A and 4B are schematic diagrams showing an example of structure of the injection molding system of the present invention having a main clamping unit and a plurality of movable sub-clamping units, where FIG. 4A is a front view thereof and FIG. 4B is a plan view thereof.

FIG. 6 is a flow chart describing an example of operation according to the injection molding system of the present invention.

FIGS. 7A–7C are schematic plan views showing another example of structure and operation of the injection molding system of the present invention having a main clamping unit and a plurality of movable sub-clamping units.

FIG. 8 is a schematic plan view showing a further example of structure of the injection molding system of the present invention having a main clamping unit and a plurality of movable sub-clamping units.

DETAILED DESCRIPTION OF THE INVENTION

The injection molding system of the present invention will be described in detail with reference to the accompanying drawings. The injection molding system is designed to include a plurality of movable sub-clamping (mold) units alternately advancing to a location of a main clamping unit for only an filling process. As soon as the filling process is done, the sub-clamping unit comes out from the main clamping unit for the holding process and cooling process. Thus, the injection molding system is able to dramatically improve the molding production efficiency while reducing an overall system cost.

Figure 1:
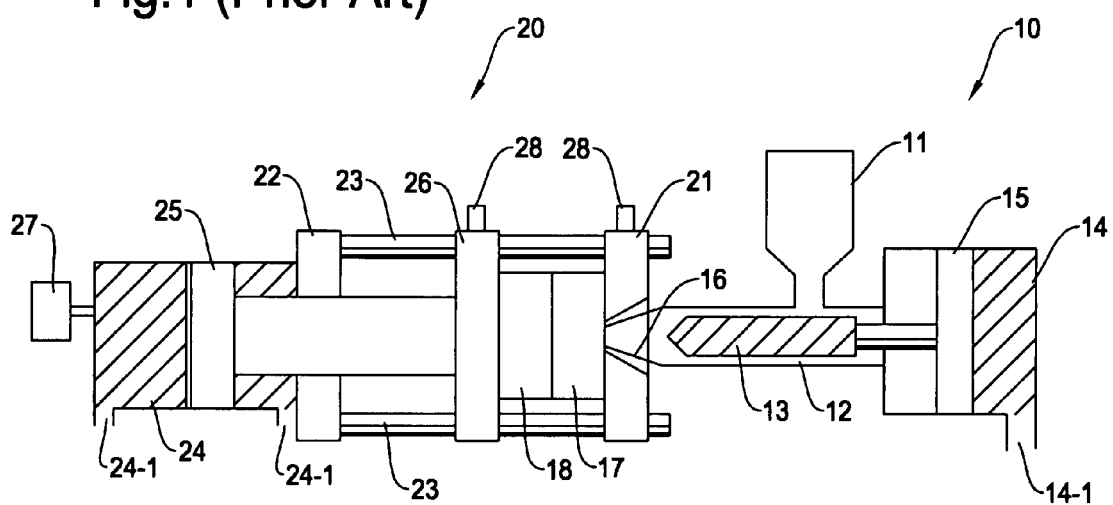
FIG. 1 is a schematic diagram illustrating an example of horizontal type injection molding machine configured by an injection unit and a clamping unit in the conventional technology.
Figure 2A:
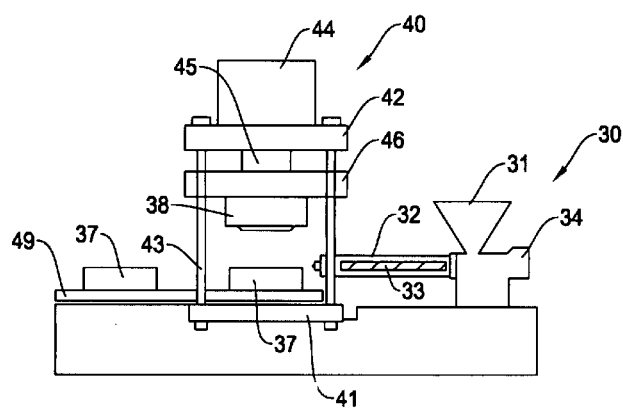
FIGS. 2A and 2B schematically show an example of injection molding machine of a vertical type in the conventional technology where
Figure 2B:
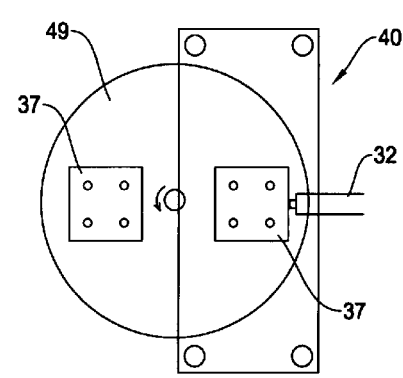
Figure 3:
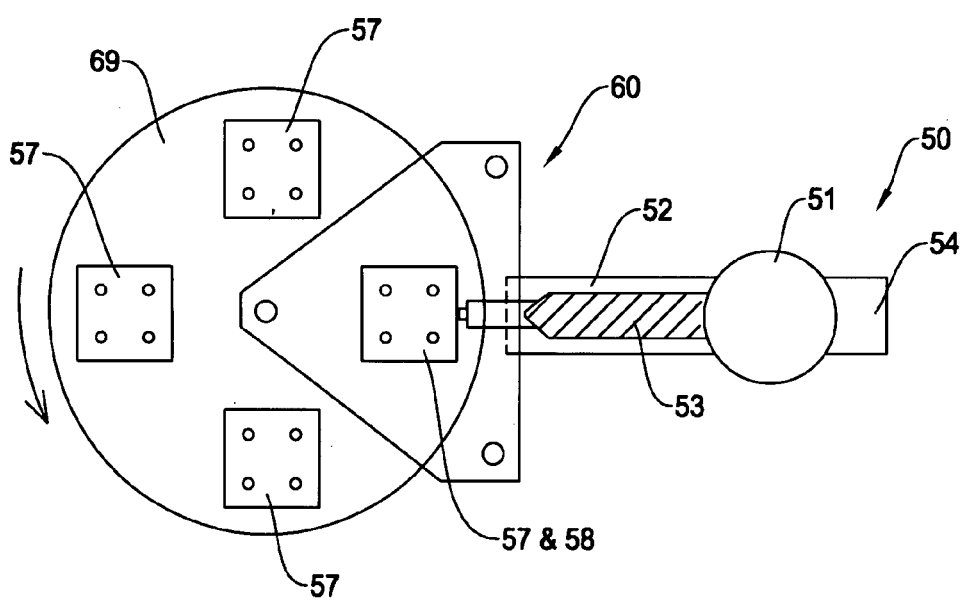
FIG. 3 is a schematic plan view showing an example of rotary type injection molding machine of a vertical type in the conventional technology.
Figure 4A:
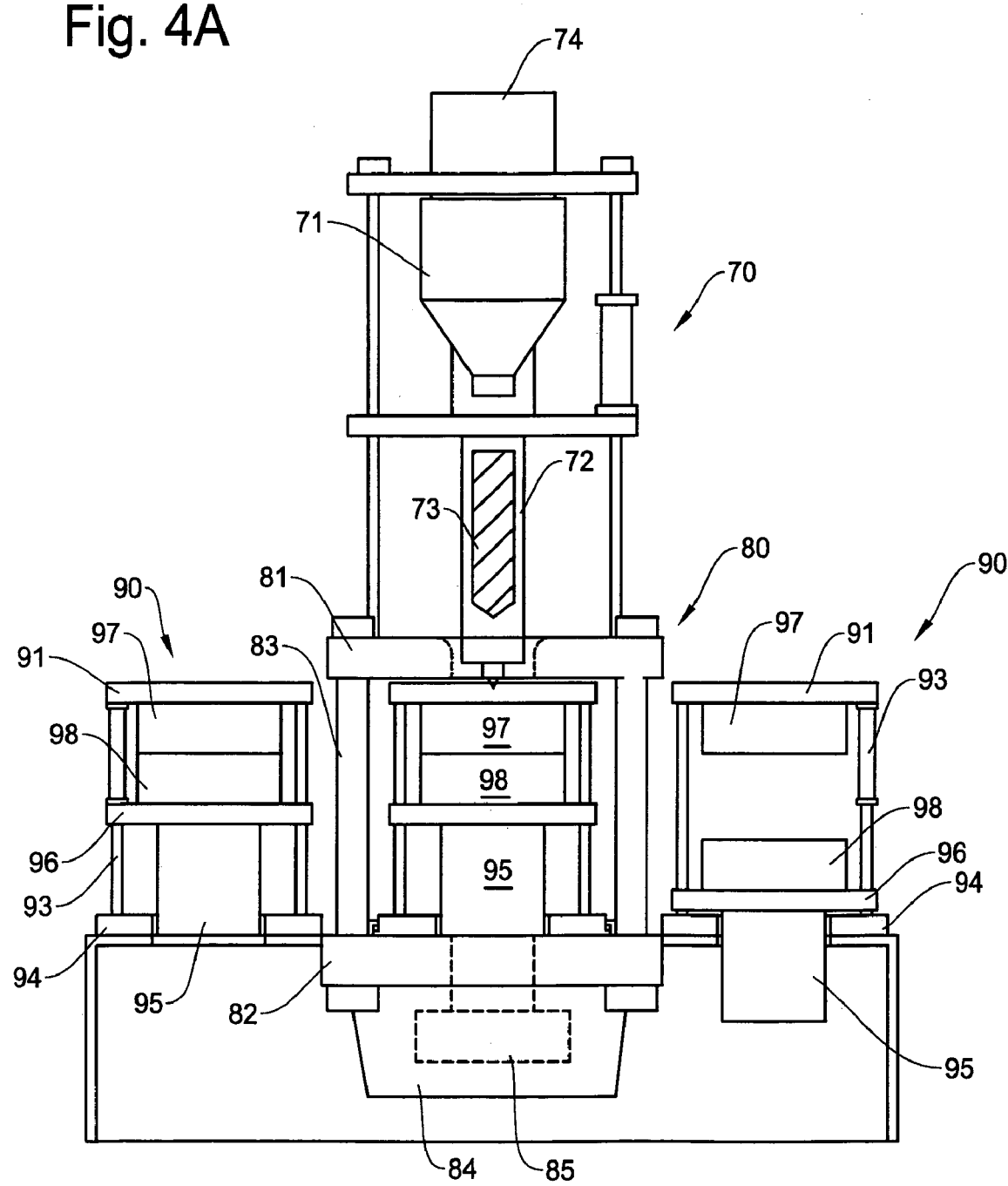

FIGS. 4A and 4B are schematic diagrams showing an example of structure of the injection molding system of the present invention having a main clamping unit and a plurality of movable sub-clamping units. FIG. 4A is a front view and FIG. 4B is a plan view, respectively, of the injection molding system. In the plan view of FIG. 4B, an injection unit is not shown for more clearly illustrating the features of the present invention.

In FIG. 4A, the injection molding system includes an injection unit 70, a main clamping unit 80, and a plurality of sub-clamping (mold) units 90. The injection unit 70 is to inject the melted resin material into the mold in the sub-clamping unit 90. The main clamping unit 80 is to clamp the mold in the sub-clamping unit 90 by a high clamping pressure sufficient for the injection process by the injection unit 70. Each of the sub-clamping units 90 has a mold configured by an upper mold and a lower mold and a clamping mechanism for clamping the mold. The clamping mechanism produces a clamping pressure much lower than that of the main clamping unit 80. Each sub-clamping unit 90 also includes a transfer mechanism 94 which is designed to move back and forth between its station and the main clamping unit 80.

As shown in FIG. 4B, in this example, the injection molding system is configured by four sub-clamping units 90, i.e., four stations, which are arranged around the main clamping unit 80. Various other systems such as ones having six stations, eight stations, sixteen stations, etc. are possible. Further, the sub-clamping units 90 can be identical to one another or can be different from one another in size, shape, and types of mold incorporated depending on the needs of the users.

In FIG. 4A, in the injection unit 70, resin material is introduced into a hopper 71 and is supplied to a heating cylinder 72. The resin material is melted in the heating cylinder 72 and is kneaded by a screw 73. The screw 73 is moved downward towards the mold (in the sub-clamping unit 90) by a mechanism such as a hydraulic cylinder 74. The melted resin material reserved in the downward area of the screw 73 is delivered through a nozzle to be filled within a cavity of the mold in the sub-clamping unit 90.

The main clamping unit 80 has a fixed platen 81 on which the injection unit 70 is mounted and a lower platen 82 on which the sub-clamping unit 90 is alternately positioned. The fixed platen 81 and the lower platen 82 are fixedly supported through support bars 83 (only two of them are illustrated). On the lower platen 82, a clamping mechanism is provided which is formed by a drive mechanism such as a hydraulic cylinder 84 and a piston 85. The hydraulic cylinder 84 moves the piston 85 in an up/down direction. When the sub-clamping unit 90 is positioned in the main clamping unit 80, the clamping mechanism further clamps the mold in the sub-clamping unit 90 through the piston 85. When the mold is clamped by the main clamping unit 80, the melted resin material from the injection unit 70 is filled in the cavity of the mold to form the molding article.

The sub-clamping unit 90 has a fixed platen 91 on which a fixed mold (upper mold) 97 is mounted and a lower platen 96 on which a movable mold (lower mold) 98 is mounted. The fixed platen 91 and the lower platen 96 are supported through support bars 93 (only two of them are illustrated). On the lower platen 96, a clamping mechanism 95 such as a hydraulic cylinder is formed to move the lower mold 98 in an up/down direction. The clamping power by the clamping mechanism 95 is much lower than that of the clamping mechanism in the main clamping unit 80 because it is sufficient that the sub-clamping unit 90 can clamp the mold in the holding process and the cooling process. The high clamping power that is necessary for the injection period (filling process) is provided by the main clamping unit 80. As noted above, each sub-clamping unit 90 is able to move back and forth between the corresponding station and the main clamping unit 80 by its own transfer mechanism 94.

As shown in the example of FIG. 4B, the injection molding system may further include other mechanisms depending on the particular needs. An example of such a mechanism includes an automatic handler 100 for taking out the molding article (molded product) from the mold after the cooling period, a bar code reader and printer 102 for reading the bar codes on the sub-clamping unit or mold and for printing the information regarding the system operation, a system controller 104 for controlling the overall system operation based on various information including the data from the bar code reader and printer 102.

In the arrangement of FIGS. 4A and 4B, the sub-clamping unit 90 clamps the fixed mold 97 and the movable mold 98 by its own clamping mechanism 95. The sub-clamping unit 90 enters the main clamping unit 80 in which the mold is further clamped by the higher clamping pressure produced by the hydraulic cylinder (clamping mechanism) 84 during the time for filling the molten resin in the mold. Each sub-clamping unit 90 is retracted from the main clamping unit 80 as soon as the filling process is completed and positioned outside of the main clamping unit 80 through the holding process and the cooling process. Further, because of the clamping mechanism 95, each sub-clamping unit 90 is able to open and close the mold by itself for retrieving a molding article therefrom after the cooling process.

As noted above, the sub-clamping unit 90 is clamped by the main clamping unit 80 by the high clamping pressure only during the filling process. In other words, the sub-clamping unit 90 enters the main clamping unit 80 only for the filling process and comes out from the main clamping unit 80 immediately after the filling process. The sub-clamping unit 90 stays outside of the main clamping unit 80 during the remaining processes because it has its own clamping mechanism 95 for clamping the mold. When one sub-clamping unit 90 comes out from the main-clamping unit 80, other sub-clamping unit 90 can enter the main clamping unit immediately thereafter for only the filling process.

Therefore, the injection molding system of the present invention is able to dramatically increase the molding efficiency because the main clamping unit is occupied only for a time period required for injecting the molten resin into the mold. The order of the sub-clamping units 90 for entering the main clamping unit 80 can be freely changed because each sub-clamping unit 90 has its own transfer mechanism 94. Thus the injection molding system of the present invention does not have to stop even when problems arise in one or more sub-clamping units 90.

FIGS. 5A–5D are schematic plan views showing an example of operation of the injection molding system of the present invention when four sub-clamping units (molds) 90 are incorporated. For simplicity of illustration of the invention, the injection unit 70 of FIG. 4A is not shown in FIGS. 5A–5D. As noted above, since each of the sub-clamping units 90 has its own clamping mechanism, the mold in the sub-clamping unit 90 is clamped at the outside of the main clamping unit 80 most of the time except when the molding article is taken out (unloading process).

Figure 5A:
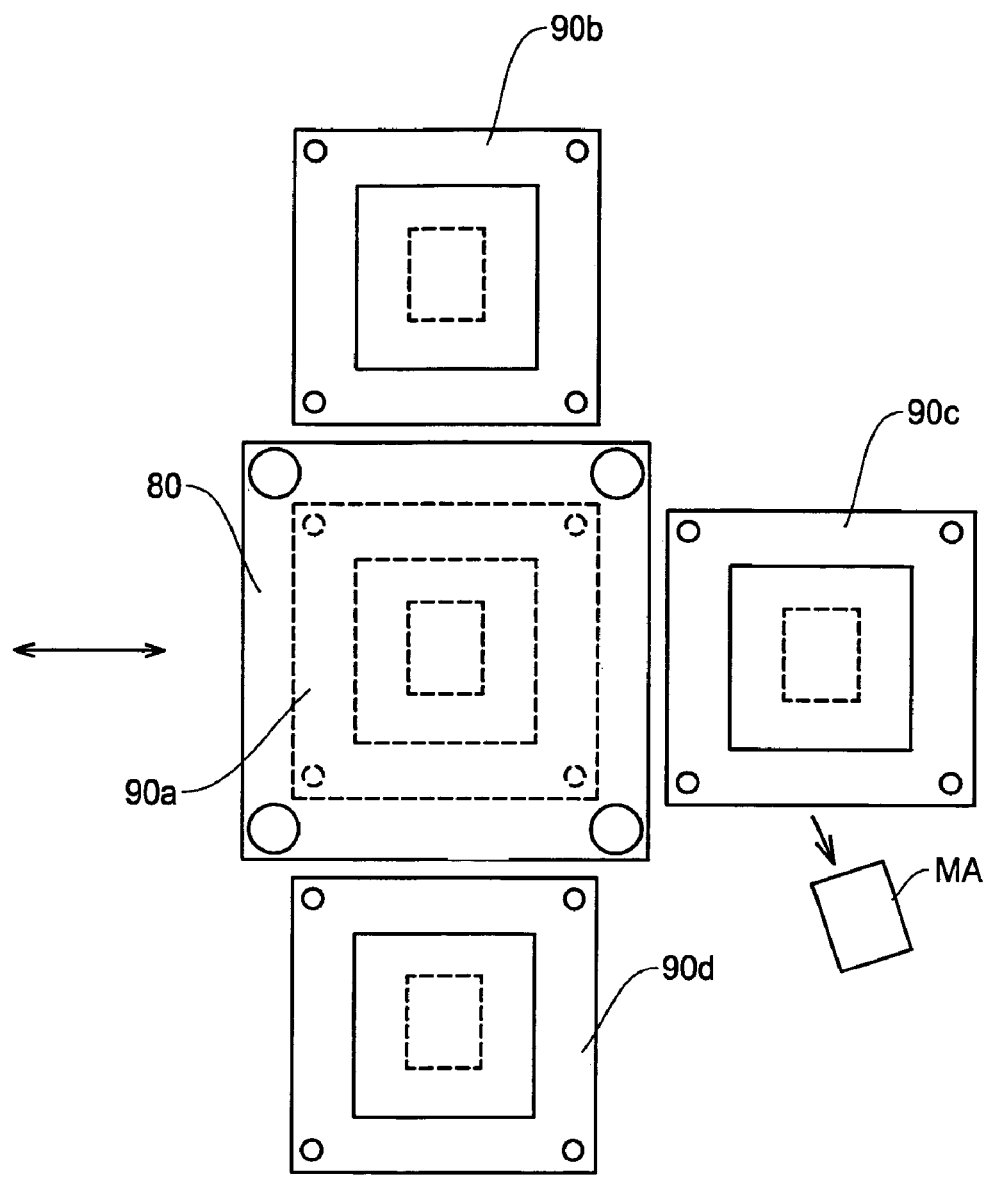
FIGS. 5A–5D are schematic plan views showing an example of operation of the injection molding system of the present invention when four sub-clamping (open/close) units are incorporated.

FIG. 5A shows a situation where the sub-clamping unit 90a enters the main clamping unit 80 for receiving the melted resin material from the injection unit 70. As soon as the sub-clamping unit 90a enters the main clamping unit 80, the clamping mechanism 84 in the main clamping unit 80 clamps the upper mold 97 and the lower mold 98 in the sub-clamping unit 90a with the pressure sufficient for the filling process. The sub-clamping units 90b–90d are outside of the main clamping unit 80 and are either in the holding process, cooling process or unloading process. In this example, the sub-clamping unit 90c is in the unloading process for taking out the molding article MA from the mold.

Figure 5B:
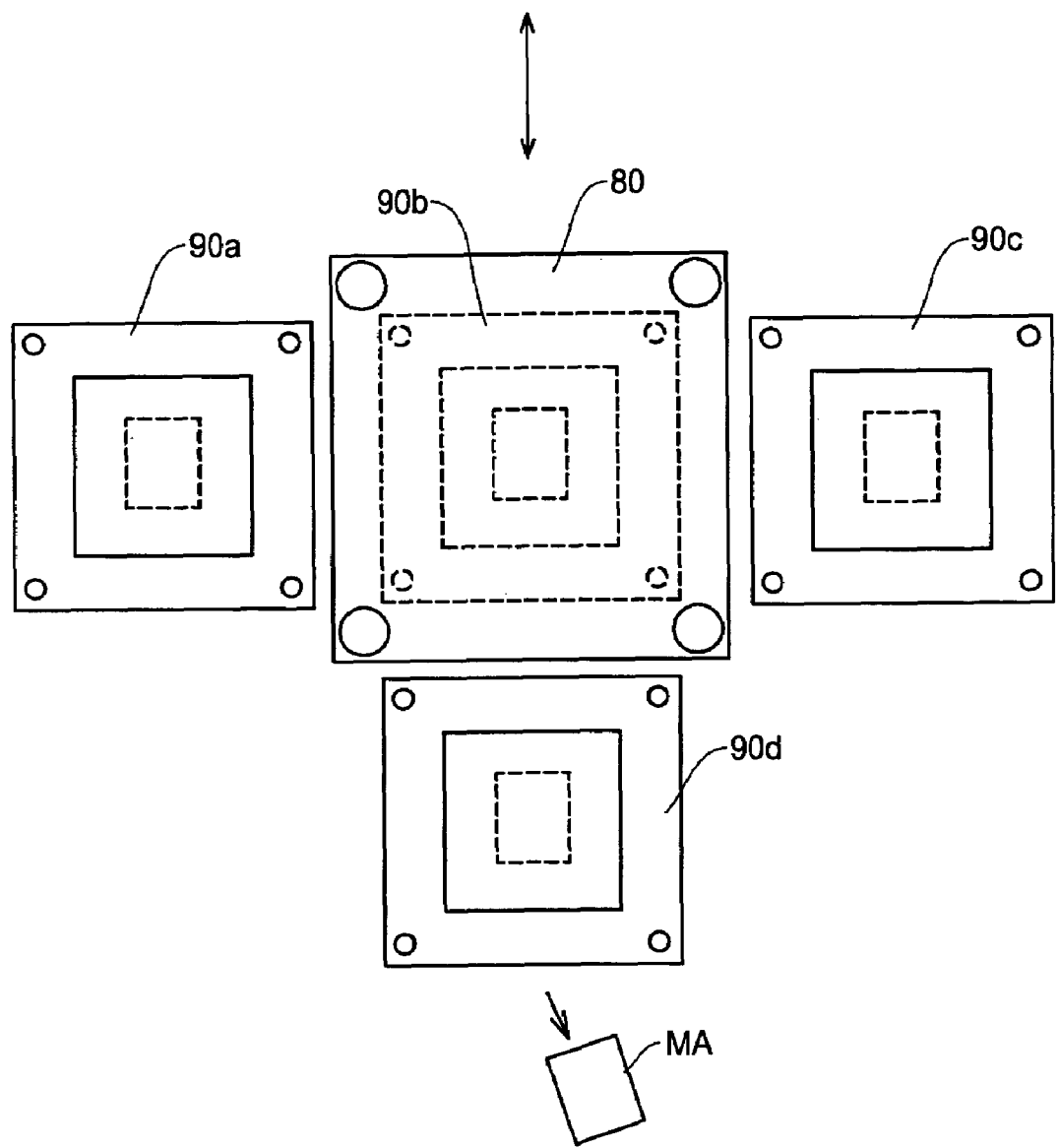

As soon as the melted resin material is filled in the mold of the sub-clamping unit 90a, as shown in FIG. 5B, the sub-clamping unit 90a moves back to the original position and the sub-clamping unit 90b enters the main clamping unit 80. By its own clamping mechanism 95, the sub-clamping unit 90a clamps the mold throughout the holding process and the cooling process at the outside of the main clamping unit 80. In this example, the sub-clamping unit 90d is in the unloading process for taking out the molding article MA from the mold.

Figure 5C:
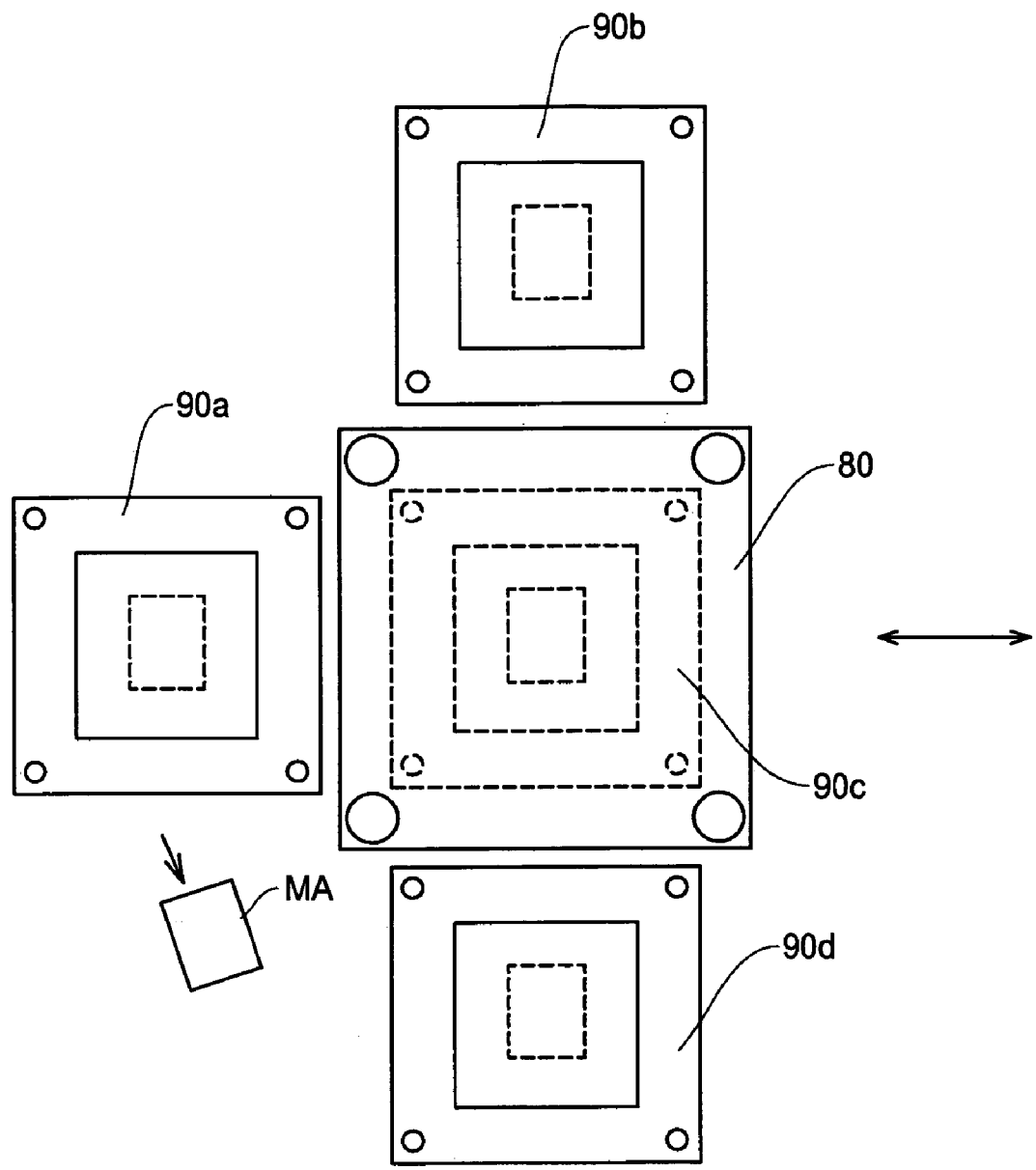

Similarly, as soon as the melted resin material is filled in the mold of the sub-clamping unit 90b, as shown in FIG. 5C, the sub-clamping unit 90b moves back to the original position and the sub-clamping unit 90c enters the main clamping unit 80. By its own clamping mechanism 95, the sub-clamping unit 90b clamps the mold through the holding process and the cooling process at the outside of the main clamping unit 80. In this example, the sub-clamping unit 90a is in the unloading process for taking out the molding article MA from the mold.

Figure 5D:
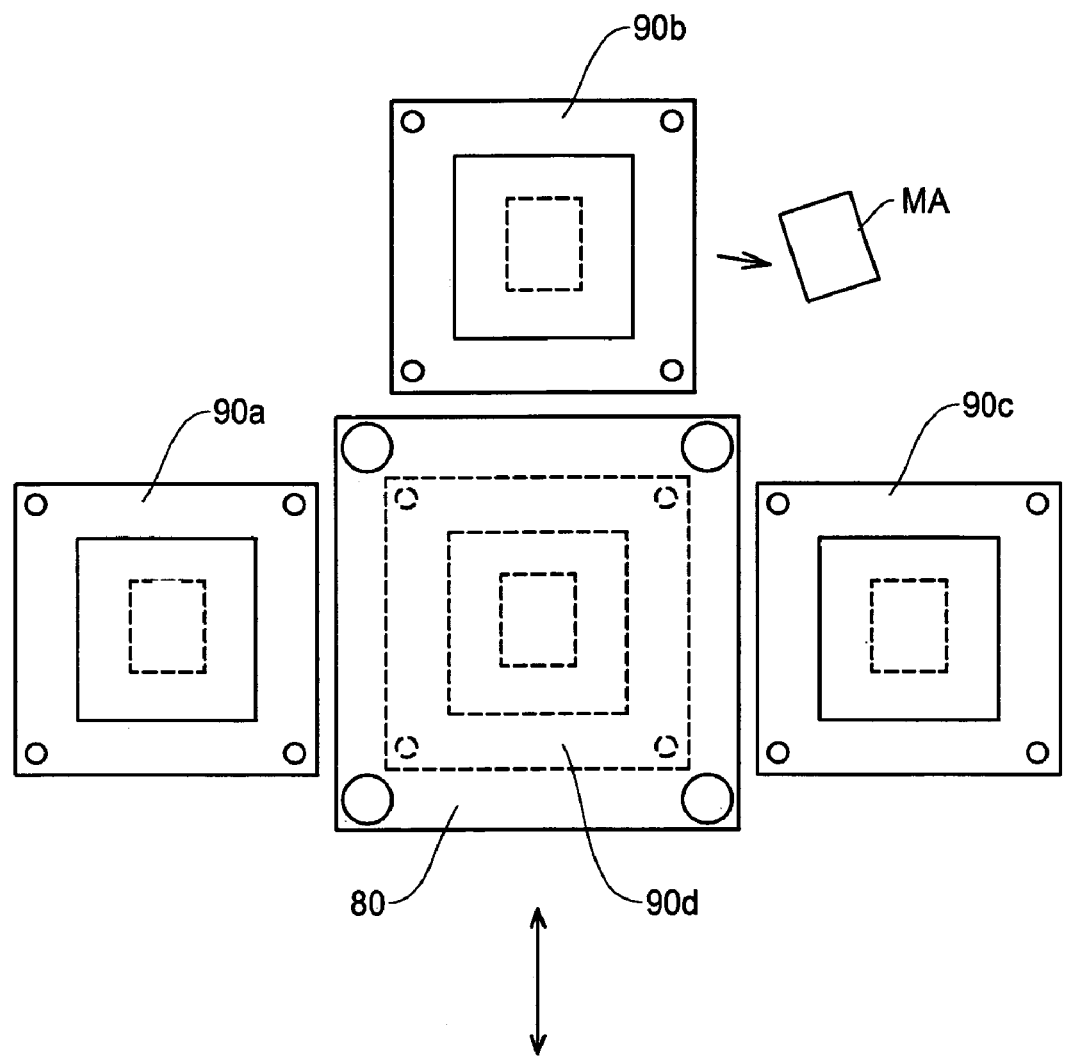

Similarly, as soon as the melted resin material is filled in the mold of the sub-clamping unit 90c, as shown in FIG. 5D, the sub-clamping unit 90c moves back to the original position and the sub-clamping unit 90d enters the main clamping unit 80. By its own clamping mechanism 95, the sub-clamping unit 90c clamps the mold through the holding process and the cooling process at the outside of the main clamping unit 80. In this example, the sub-clamping unit 90b is in the unloading process for taking out the molding article MA from the mold.

FIG. 6 is a flow chart describing an example of operation of the injection molding system of the present invention. At step 130, the injection molding system starts the process by clamping the mold (ex. upper mold 97 and lower mold 98) in the sub-clamping unit 90 by the clamping mechanism 95 therein. The mold is emptied in advance by removing the molding article therefrom. As noted above, it is not necessary to apply a high clamping pressure to the mold because such a high clamping pressure is necessary only in the injection (filling) process, and such a high pressure is supplied by the main clamping unit 80.

As soon as the main clamping unit 80 becomes vacant, the sub-clamping unit 90 moves (by the transfer mechanism 94) to a predetermined position in the main clamping unit 80 at step 131. In this position, the nozzle of the injection unit 70 is aligned with an annular opening of the mold. At step 132, the main clamping unit 80 clamps the mold in the sub-clamping unit 90 by the high clamping power sufficient for the injection. At step 133, the filling process is conducted in which the injection unit 70 injects the melted resin material into the mold in the sub-clamping unit 90 so that the melted resin material is filled in the cavity of the mold.

In step 134, as soon as the melted resin material is filled in the mold, the clamping pressure by the main clamping unit is released and the sub-clamping unit 90 returns to the original position outside of the main clamping unit. The sub-clamping unit 90 keeps clamping the mold by the clamping mechanism 95 during the holding process and the cooling process in step 135. As noted above, since the holding process and the cooling process do not require a high clamping pressure, the clamping mechanism 95 of lower clamping pressure in the sub-clamping unit 90 is sufficient to conduct this clamping operation.

After the cooling process, at step 136 the mold is opened by operating, for example, the clamping mechanism 95 to retrieve the molding article from the mold. The process goes back to the step 130 to clamp the emptied mold by the clamping mechanism 95 in the sub-clamping unit 90. At the end of the steps 134 and 136, the process determines whether the current mold is the last mold of the production scheme in step 137. If the answer is "Yes", the process ends. If the answer is "No", the process goes to step 138 to select the next sub-clamping unit 90 to be sent to the main clamping unit 80. Then, the selected sub-clamping unit 90 moves to the predetermined position in the main clamping unit 80 at the step 131. The process repeats the above procedures until the production scheme is completed.

Figure 7B:
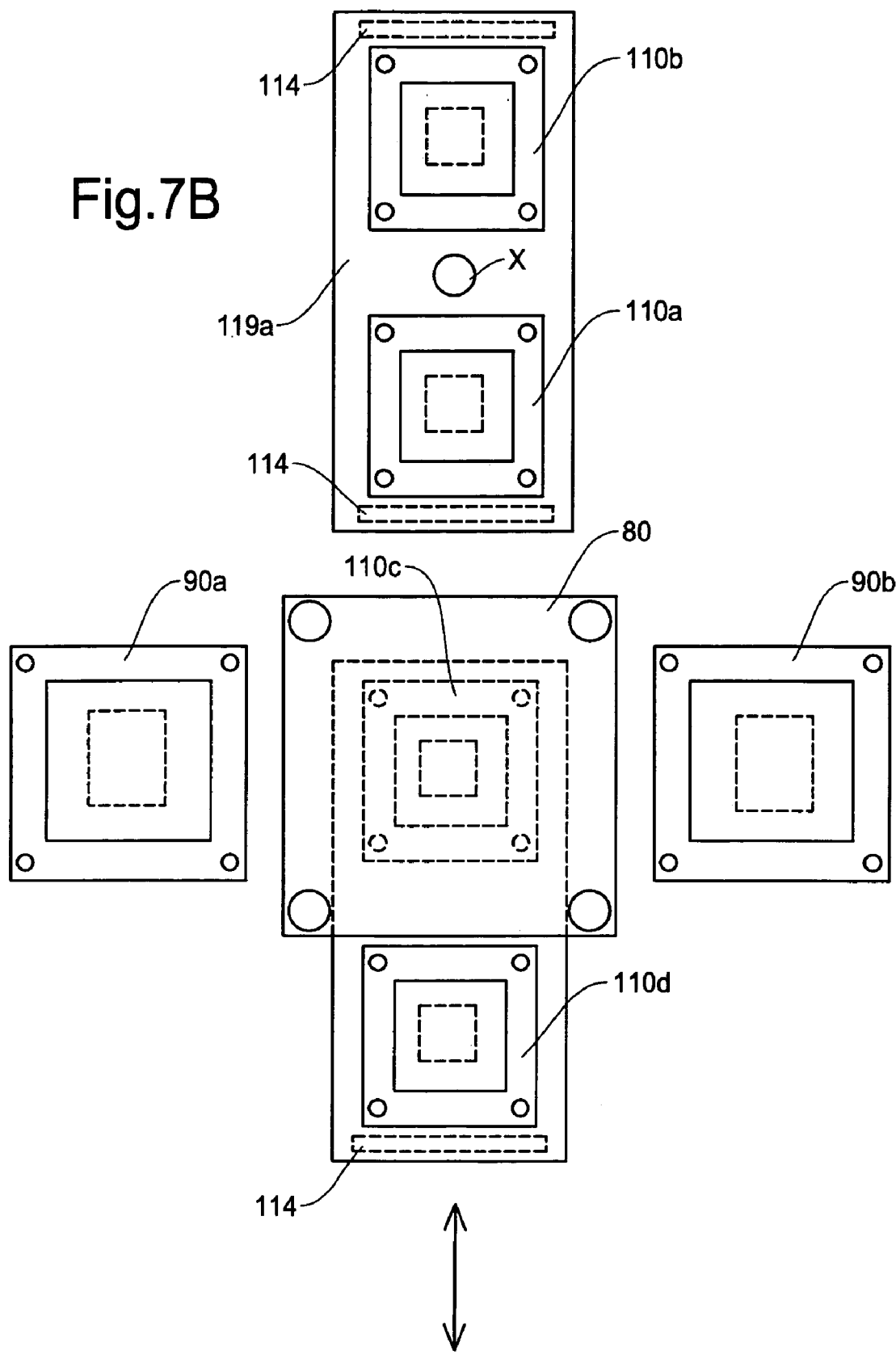

FIGS. 7A–7C are schematic plan views showing another example of structure and operation of the injection molding system of the present invention having a main clamping unit and a plurality of movable sub-clamping units. This example shows the case where six sub-clamping units are incorporated, i.e., the injection molding system has six stations. The number of stations can be changed, such as eight stations or sixteen stations, depending on various molding conditions such as a time length of holding process and cooling process, types of product, or a desired production speed.

Further, different types of sub-clamping units are used in the injection molding system. Namely, as shown in FIG. 7A, the system includes sub-clamping units 90*a*–90*b* and sub-clamping unit 110*a*–110*d* which may be different in size, shape and mold therein from one another. In this example, sub-clamping units 90*a*–90*b* are the same as the sub-clamping units 90 in FIG. 4A each having the transfer mechanism 94 to move back and force between the corresponding station and the main clamping unit 80. The sub-clamping units 110*a*–110*d* are smaller in size than the sub-clamping units 90*a*–90*b*. The sub-clamping units 110*a* and 110*b* are mounted on a table 119*a*, and the sub-clamping units 110*c* and 110*d* are mounted on a table 119*b*. Each of the tables 119*a* and 119*b* is rotatable about a center X so that it can change its direction by 180 degrees. Each of the tables 119*a* and 119*b* is also movable toward the main clamping unit 80 by a transfer mechanism 114. Thus, all the sub-clamping units 110*a*–110*d* can be moved to the main clamping unit 80 one by one.

FIG. 7B shows a case where the sub-clamping unit 110*c* enters the main clamping unit 80 by the movement of the table 119*b* produced by the transfer mechanism 114. The sub-clamping units 90*a*–90*b*, 110*a*–110*b* and 110*d* are outside of the main clamping unit 80 and are either in the holding process, cooling process or unloading process. Prior to entering the main clamping unit 80, the mold in the sub-clamping unit 110*c* is clamped by the clamping mechanism of the sub-clamping unit 110. When the sub-clamping unit 110*c* is accurately positioned, the main clamping unit 80 clamps the mold by the high clamping pressure sufficient for receiving the melted resin material from the injection unit 70.

As soon as the filling process is done, the sub-clamping unit 110*c* is retracted from the main clamping unit 80 by the movement of the table 119*b*. Thus, as shown in FIG. 7C, the sub-clamping unit 90*a* now enters the main clamping unit 80. The sub-clamping unit 110*c* keeps clamping the mold during the holding process and cooling process outside of the main clamping unit 80. During this process, the table 119*b* rotates for changing the direction so that the sub-clamping unit 110*d* can enter the main clamping unit 80. In this manner, the injection molding system is able to consequently perform the injection process at high speed.

FIG. 8 shows a further example of structure of the injection molding system of the present invention. In this example, the system includes tables 219*a* and 219*b* each mounting four sub-clamping units 210 thereon. The tables 219*a* and 219*b* can rotate about the center X so that all of the sub-clamping units 210*a*–210*h* can enter the main clamping unit 80 one by one for the filling process.

As has been described in the foregoing, according to the present invention, the injection molding system is configured by a main clamping unit and a plurality of sub-clamping units each having a fixed mold and a movable mold. Each sub-clamping unit clamps the fixed mold and the movable mold by its own clamping mechanism and moves to the main clamping unit where the mold is further clamped by a higher clamping pressure during a time when filling the molten in the mold. Each sub-clamping unit is retracted from the main clamping unit immediately after the filling process and stayed outside of the main clamping unit through the holding process and the cooling process. Further, each sub-clamping unit is able to open and close the mold by itself thereby retrieving a molding article therefrom after the cooling process.

Namely, the sub-clamping unit is clamped by the main clamping unit by the high clamping pressure only during the filling process. In other words, the sub-clamping unit enters the main clamping unit only for the filling process and comes out from the main clamping unit for the remaining processes because it has its own clamping mechanism for clamping the mold. When one sub-clamping unit comes out from the main-clamping unit, other sub-clamping unit can enter the main clamping unit immediately thereafter, thereby enabling to dramatically increase the molding efficiency because the main clamping unit is occupied only for a time period for injecting the molten into the mold. The order of the sub-clamping units for entering the main clamping unit can be freely changed because each sub-clamping unit has a transfer mechanism, thus, the injection molding system of the present invention does not have to stop even when problems arise in one or more sub-clamping units.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. An injection molding system for carrying out an injection molding cycle, comprising:

a plurality of sub-clamping units each being physically separate from one another and having a mold configured by a fixed mold and a movable mold and a clamping mechanism for clamping the mold with a predetermined pressure;

an injection unit which produces melted resin material and injects the melted resin material into a cavity in the mold in the sub-clamping unit;

a main clamping unit which clamps the mold in the sub-clamping unit as soon as the sub-clamping unit is positioned therein by a clamping pressure sufficient for the mold to receive the melted resin material from the injection unit; and a plurality of transfer mechanisms each being provided to corresponding one of said sub-clamping units to move the sub-clamping unit in a straight line direction between a predetermined location and the main clamping unit;

wherein each of the sub-clamping units is moved back and forth by said transfer mechanism independently from and asynchronously with one another between the predetermined location and the main clamping unit, and wherein the sub-clamping unit comes out from the main clamping unit as soon as the cavity of the mold is filled with the melted resin material.

2. An injection molding system as defined by claim 1, wherein the clamping mechanism in the sub-clamping unit comprising means for continuously clamping the mold by pressing the movable mold before, during and after receiving the melted resin material from the injection unit.

3. An injection molding system as defined by claim 1, wherein the main clamping unit comprising means for releasing the clamping pressure applied to the mold as soon as the melted resin material is filled in the cavity of the mold so that the sub-clamping unit can come out from the main clamping unit immediately thereafter.

4. An injection molding system as defined by claim 1, wherein the clamping mechanism in the sub-clamping unit comprising means for continuously clamping the mold by pressing the movable mold after receiving the melted resin material in the cavity during a holding process and a cooling process of the molding cycle at the outside of the main clamping unit.

5. An injection molding system as defined by claim 1, wherein the clamping mechanism in the sub-clamping unit opens comprising means for opening the mold by withdrawing the movable mold from the fixed mold after a cooling process of the molding cycle for retrieving a molding article from the mold.

6. An injection molding system as defined by claim 1, further comprising a system controller to control an overall operation of the system, wherein system controller controls so that as soon as the sub-clamping unit comes out from the main clamping unit, other sub-clamping unit clamping the mold therein moves to the main clamping unit to be clamped by the main clamping unit with the clamping pressure sufficient for the mold to receive the melted resin material from the injection unit, and the other sub-clamping unit comes out from the main clamping unit as soon as the cavity of the mold is filled with the melted resin material.

7. An injection molding system as defined by claim 1, further comprising a table which mounts two or more sub-clamping units thereon, wherein the table includes a transfer mechanism to transfer the sub-clamping unit back and forth between a predetermined location and the main clamping unit.

8. An injection molding system as defined by claim 1, further comprising a table which mounts two or more sub-clamping units thereon, wherein the table includes a transfer mechanism to transfer the sub-clamping unit back and forth between a predetermined location and the main clamping unit, and a rotary mechanism to change a direction of the table so that each and every sub-clamping unit on the table can be transferred to the main clamping unit.

9. An injection molding system as defined by claim 1, wherein the plurality of sub-clamping units are identical to one another or different from one another in size, shape, and type of mold.

10. An injection molding system as defined by claim 1, wherein the plurality of sub-clamping units comprising means for moving to the main clamping unit one by one in a predetermined order where the predetermined order can be changed when a problem arises in a sub-clamping unit.

11. An injection molding system as defined by claim 1, further comprising an automatic handler to retrieve a molding article from the mold.

* * * * *